Feb. 27, 1962  J. H. HOFFMANN ETAL  3,023,331
COLLECTOR LEAD ARRANGEMENT
Filed July 1, 1959
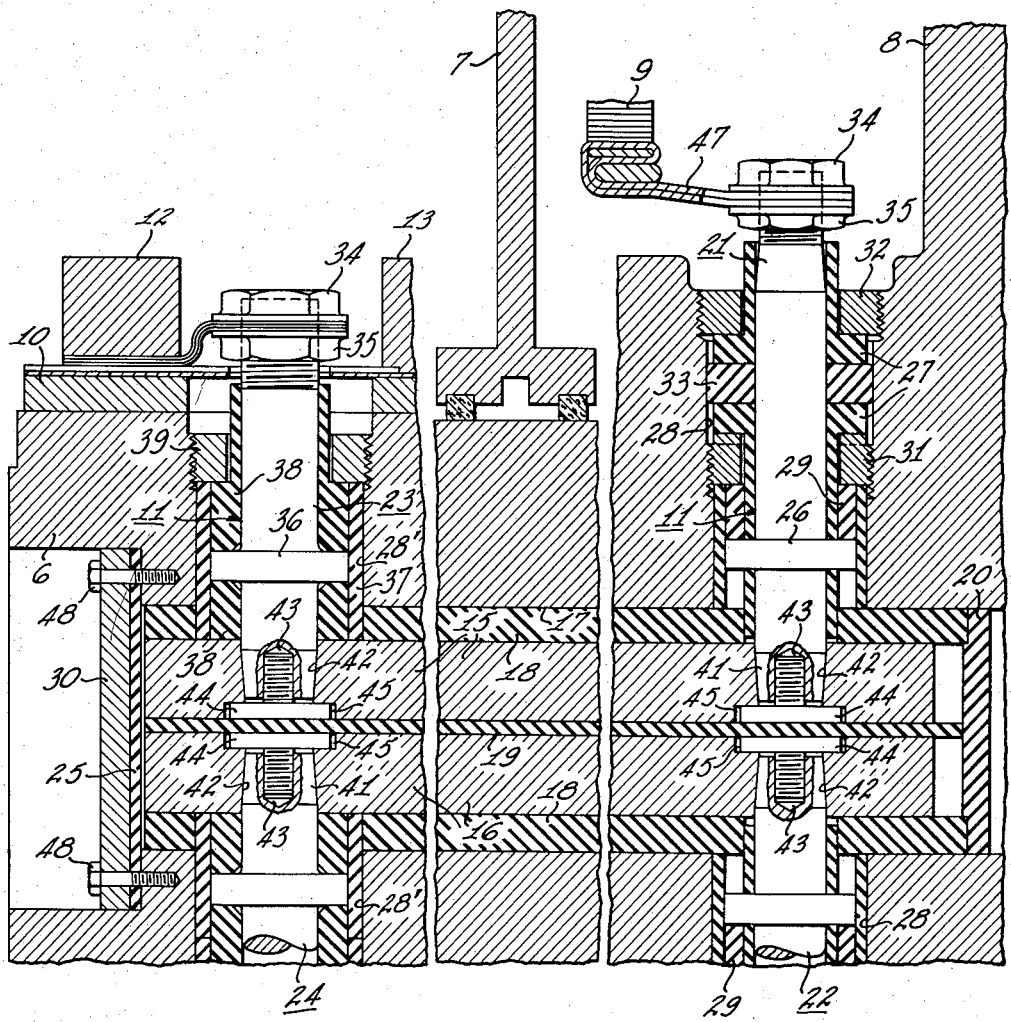
Inventors
Jack H. Hoffman
William P. Hogstad
By Arthur M. Streich
Attorney

United States Patent Office 3,023,331
Patented Feb. 27, 1962

3,023,331
COLLECTOR LEAD ARRANGEMENT
Jack H. Hoffmann, West Allis, and William P. Hogstad, Milwaukee, Wis., assignors to Allis-Chalmers Manufacturing Company, Milwaukee, Wis.
Filed July 1, 1959, Ser. No. 824,366
3 Claims. (Cl. 310—232)

This invention relates to dynamoelectric machines having collector leads disposed in an axial bore in the rotor shaft for connecting the rotor windings, which are within a gas filled housing, to a current collecting device mounted on the rotor shaft outside of the housing.

In machines such as turbogenerators, the rotor winding lead conductors must be constructed and arranged to withstand centrifugal stresses and high voltages, and so they do not cause rotational unbalance. It is sometimes necessary after balance tests to disassemble the collector lead arrangement and reassemble it again before final balance tests are passed. It is also necessary to disassemble the collector lead arrangement to rewind a machine, which may be done in the field when all tools are not available. Therefore, it is further desired that the collector means provide damage free assembly and disassembly.

One arrangement utilized to connect the rotor windings and the current collecting device is shown in U.S. Patent 2,798,977 which utilizes a conductor axially disposed in the axial bore and radially extending conductors disposed in radial apertures in the shaft. The apertures open into the bore adjacent the current collecting device and the rotor winding. Each stud is suitably insulated and sealed in the radial aperture in the shaft, being connected to the axial conductor by means of a thread cut on the portion of the stud that engages a thread cut in the side walls of the aperture. This threaded portion of the stud and the aperture are both tapered so that as the stud is turned into the aperture a good tight fit and good electrical contact is attained. However, this often results in galling the engaging threads and makes the sometimes necessary disassembly and reassembly of the collector lead arrangement difficult or impossible.

Furthermore, the prior art arrangement also provides for attaching the stud to the windings and current collector in a way that is not entirely satisfactory. According to this prior art arrangement, the end of the stud that engages the windings and collector, is also tapered and also threaded. A collar or cap nut is turned on to the threaded portion and a lead from the winding or collector is laid across the top of the nut. A plate is then laid over the lead and the plate, lead, and nut connected together by several screws. Since the nut must be tapped to receive the screws before assembly and the nut must be turned on the stud during assembly, the assembler sometimes faces a dilemma. To position the nut so the screws can be inserted, he must force the nut more than just tight, and thereby gall the threads of the nut and/or the stud.

The present invention provides a new and improved construction of a collector lead arrangement to provide a relatively inexpensive assembly connecting the current collector to the rotor winding and provide for the assembly and disassembly of the apparatus without galling.

It is an object of the present invention to provide a new and improved collector lead arrangement for connecting the rotor winding and the current collecting device through a lead conductor disposed within an axial bore in a shaft.

Another object of the invention is to provide a new and improved collector lead arrangement that will insure positive tightness in assembly.

Another object of this invention is to provide a new and improved collector lead arrangement that minimizes the hazard of galling threaded surfaces during assembly.

Other objects of the invention will be apparent from the following description taken with the accompanying drawing in which the single figure is a view in axial across section of an axially interrupted portion of a dynamoelectric machine embodying the present invention.

In the drawing, the dynamoelectric machine shown is a high speed turbogenerator comprising a rotatable shaft 6 extending through a suitable housing 7 and supported on bearings (not shown). Housing 7 is preferably gas tight and is fillable with hydrogen as a ventilating gas. A rotor core 8 is preferably integral with the shaft 6 and comprises an axially extending field winding (not shown) having end turns 9 secured in a known manner by a rotor retaining ring (not shown).

A source of excitation current (not shown) is supplied to the field winding (not shown) through means including a current collecting device shown in the drawing as slip rings 12, 13, terminal leads 47 connected to and extending from the winding (not shown) and the slip rings 12, 13 and a collector lead arrangement shown in the drawing as assembly 11 for connecting a terminal lead of the slip rings to a terminal lead of the winding. The slip rings 12, 13 are suitably mounted on the portion of the shaft 6 outside of the housing 7. As shown in the drawing, a sleeve 10 is removably mounted on the shaft 6. The slip rings 12, 13 are mounted on and suitably insulated from sleeve 10.

The collector lead arrangement 11 includes lead conductors 15, 16 preassembled and inserted as a unit in an axial bore 17 centrally located in shaft 6. Such preassembled unit includes a tube of insulating material 18 with conductors 15, 16 being bare conductor bars disposed in the tube and separated by a strip of insulation 19. Such preassembled unit is described in U.S. Patent 2,798,977 to Mathias Henter.

The collector lead arrangement 11 also includes, besides the axially disposed bare conductors 15, 16, radially disposed conductors shown as studs 21, 22 in radial apertures 28 in shaft 6, apertures 28 open to the axial bore 17 adjacent the rotor winding 8, and studs 23, 24 in radial aperture 28' in the shaft adjacent slip rings 12, 13.

The axially disposed bare conductors 15, 16 are provided with radially outward flaring tapered apertures 42 adjacent the ends thereof and transverse milled slots 45 on the radially innermost surface of conductors 15, 16 that communicate with tapered apertures 42.

The studs 21 to 24 are connected to the axially extending conductors 15, 16, by providing the studs 21 to 24 with a smooth tapered shank portion 41. The end of the stud adjacent the tapered shank portion 41 of studs 21 to 24 is provided with a threaded axially extending bore 43.

Means are provided, such as bolts 44, to secure each of studs 21 to 24 in a tapered aperture 42. Each of the bolts 44 is provided with a head and a threaded portion. The head of each bolt 44 is recessed in one of slots 45 and cooperates with the sides thereof to prevent turning. The threaded portion of each bolt 44 extends radially outward through one of apertures 42 in axial conductors 15, 16 and threadedly engages bore 43 thereby securing each of studs 21 to 24 in one of axial conductor apertures 42.

The radially outer portions of studs 21 to 24 are provided with a standard machine thread and receive thereon a terminal clamp comprising a jam nut 35 and a cap nut 34.

Any suitable means may be utilized to insulate and seal studs 21 to 24 in radial shaft bores 28, 28'. The arrangement shown in the drawing is similar to the arrangement shown in U.S. 2,798,977. However, applicant does not intend to thus limit the scope of his invention to the structure as shown. As shown in the drawing, stud 21 is provided with shoulder 26, preferably integral with the stud.

Insulating means, shown as 27 in the drawing, are provided to closely surround the stud 21 above and below collar 26. An annular thrust transmitting block 29 is disposed around stud 21 and seated on the face of collar 26 remote from the axis of shaft 6. A nut 31 is provided in threaded engagement with the walls of radial shaft bore 28 to exert a thrust force against thrust block 29 to rigidly secure the insulation surrounding stud 21 in shaft 6 against centrifugal forces. A sealing ring 33 is disposed in the insulation means 27 intermediate stud collar 26 and the radial outermost portion of the radial shaft bore 28. Means such as nut 32 is provided at the radial outermost portion of radial shaft bore 28 to compress sealing ring 33 thereby providing a gas tight seal between radial shaft bore 28 and stud 21.

Stud 22 is disposed in radial shaft bore 28 diametrically opposite stud 21 and is constructed and arranged therein as described for stud 21.

Studs 23 and 24 are disposed in radial shaft bore 28' adjacent the collector rings 12, 13 and may be constructed and arranged similar to stud 21. However, as shown in the drawing, studs 23 and 24 are modified to show a shoulder portion or collar 36 with a tube 37 disposed about collar 36. Tube 37 is a one piece nonconductive, elastic member, chemically stable, serving as a seal member between stud 23 and the wall of the radial shaft bore 28' in shaft 6. Insulating material 38 is disposed about stud 23 within sealing tube 37 above and below collar 36. A nut 39 is in threaded engagement with the wall of the radial shaft bore 28' to exert a biasing force against the insulation. The insulation 38 disposed above collar 36 is arranged to provide means to transmit the force exerted by nut 39 to rigidly secure the insulation surrounding stud 23 in shaft 6 against centrifugal forces. In a similar manner and at the same time, nut 39 exerts a biasing force against tube 37 to compress the tube 37 thereby providing a gas tight seal between stud 23 and radial shaft bore 28'.

Stud 24 is disposed in a radial shaft bore diametrically opposite stud 23 and is constructed and arranged therein as described for stud 23. As shown in the drawing, studs 23 and 24 are disposed outside of the housing and have been shortened to reduce the centrifugal forces thereon.

The axial bore 17 in the shaft 6 is sealed by insulation disks 20 and 25 at opposite ends. A cover plate 30 is removably attached to shaft 6, as by bolts 48, and secures disk 25 at the open end of the shaft.

In the preferred embodiment, each stud has a ¾ inch taper per 12 inch length. The apertures 42 in the conductors 15, 16 are provided with a corresponding taper. A stainless steel, square head bolt 44 is received in each slot 45 milled in the radially innermost surface of each bare conductor. The threaded portion of each bolt 45 extends radially outward through each tapered aperture 42 in bare conductors 15, 16 and threadedly engages the threaded bore 43 in each stud 21 to 24. In this arrangement, the milled slot permits the head of bolt 45 to slide along the centerline of milled slot 44. This "floating" bolt insures alignment and circumferential contact between the taper of the aperture in each conductor and the taper of each stud at assembly. A positive current contact is thus maintained during operation because bolts 44 threaded into the stud bores 43 firmly secure each stud 21 to 24 in conductors 15, 16 and thereby provides an electrical contact unaffected by centrifugal forces. In other words, the stud is "locked" into electrical contact with the bare conductor.

The top of stud 21 is connected to the end turns 9 of the winding (not shown) by means of a terminal lead 47 comprising a laminated electrically conductive lead 47 extending from end turn 9. The terminal lead 47 is provided with an eyelet that is received by stud 21. The eyelet is interposed between a jam nut 35 and a cap nut 34 on stud 21. The cap nut 34 is firmly threaded on stud 21 so that the underside of the top portion of the cap nut 34 and the top portion of stud 21 are in contiguous relationship. The cap nut 34 and jam nut 35 are provided with a washerlike face to provide a larger contact surface between the eyelet of lead 47 and the cap nut 34. As the cap nut is tightened against the jam nut 35, the terminal lead 47 is compressed between the washerlike faces of the cap nut 34 and jam nut 35 to insure adequate electrical contact between the stud 21 and terminal lead 47. The tightened assembly is then locked by suitable means (not shown) to prevent loosening due to machine vibration.

Although but one embodiment of the present invention has been shown and described, it will be understood that changes and other modifications may be made therein without the departure of the spirit of the invention or the scope of the appended claims.

Having now particularly described and ascertained the nature of our said invention and the manner in which it is to be performed, we declare that what we claim is:

1. A dynamoelectric machine having a gas filled housing, a rotor having a winding, said rotor disposed within said housing and having a shaft extending through said housing, current collecting slip rings mounted on said shaft outside of said housing, said shaft having an axial bore, a first radial aperture in said shaft opening into said bore adjacent said winding, and a second radial aperture in said shaft opening into said bore adjacent said slip rings, terminal leads connected to and extending from said winding and said slip rings, and a collector lead arrangement for connecting a terminal lead of said slip rings to a terminal lead of said winding through said first and second radial aperture and said bore, said collector lead arrangement comprising: a first stud connected to said terminal lead of said slip rings and a second stud connected to said terminal lead of said winding, the end of said stud that is connected to said terminal leads each having a threaded portion, a cap and jam nut threadedly engaging said threaded portion of said stud, and said terminal lead being interposed between said jam nut and said cap nut, said cap nut being tightened on said stud to provide electrical contact between said stud end and said cap nut, and said jam nut turned toward said cap nut to compress said terminal leads between said cap nut and said jam nut thereby providing a good electrical contact between said cap nut and one of said terminal leads, an axially extending conductor within said bore having third and fourth radial apertures and transverse slots milled in the radially innermost surface of said conductor communicating with said third and fourth apertures in said conductor, said first and third apertures having a common central axis and said second and fourth apertures also having a common axis; each stud having a cylindrical portion, a smooth surface frusto-conical end portion opposite said one end tapered to point away from said cylindrical portion and said frusto-conical end portion having defined therein a threaded bore coaxial with the axis of said stud, said first stud disposed in said first radial aperture with its tapered end portion projecting part way through said third aperture and a second stud disposed in said second radial aperture with its tapered end portion projecting part way through said fourth aperture, said third and fourth apertures each having surface portion formed to register with the smooth tapered surface of said stud end portion; and bolts securing each stud to said conductors, each of said bolts being disposed in said bore, said bolt having a head and a threaded portion said head being recessed in said milled slot and cooperating with the edges of said slot to prevent said bolt from turning, and said threaded portion of said bolt threadedly engaging said threaded axial bore in said stud to secure said tapered portion of each of said studs in said axial conductor apertures to conduct electric current between the registered smooth and tapered surfaces to thereby provide a collector lead arrangement that can be assembled and disassembled free of damage to the current conducting surface.

2. A dynamoelectric machine having a gas filled housing, a rotor having a winding, said rotor disposed within said housing and having a shaft extending through said housing, current collecting slip rings mounted on said shaft outside of said housing, said shaft having an axial bore, a first radial aperture in said shaft opening into said bore adjacent said winding, and a second radial aperture in said shaft opening into said bore adjacent said slip rings, terminal leads connected to and extending from said winding and said slip rings, and a collector lead arrangement for connecting a terminal lead of said slip rings to a terminal lead of said winding through said first and second radial aperture and said bore, said collector lead arrangement comprising: a first stud connected to said terminal lead of said slip rings; a second stud connected to said terminal lead of said winding; an axially extending conductor within said bore having third and fourth radial apertures and transverse slots milled in the radially innermost surface of said conductor communicating with said third and fourth apertures in said conductor, said first and third apertures having a common central axis and said second and fourth apertures also having a common axis; each stud having a cylindrical portion, a smooth surface frusto-conical end portion tapered to point away from said cylindrical portion and said frusto-conical end portion having defined therein a threaded bore coaxial with the axis of said stud, said first stud disposed in said first radial aperture with its tapered end portion projecting part way through said third aperture and a second stud disposed in said second radial aperture with its tapered end portion projecting part way through said fourth aperture, said third and fourth apertures each having a smooth surface portion formed to register with the smooth tapered surface of said stud end portion; and bolts securing each stud to said conductor, each of said bolts being disposed in said bore, said bolt having a head and a threaded portion, said head being recessed in said milled slot and cooperating with the edges of said milled slot to prevent said bolt from turning and said threaded portion of said bolt threadedly engaging said threaded axial bore in said stud to secure said tapered portion of each of said studs in said axial conductor apertures to conduct electric current between the registered smooth and tapered surfaces to thereby provide a collector lead arrangement that can be assembled and disassembled free of damage to the current conducting surface.

3. A dynamoelectric machine having a gas filled housing, a rotor having a winding, said rotor disposed within said housing and having a shaft extending through said housing, current collecting slip rings mounted on said shaft outside of said housing, said shaft having an axial bore, a first radial aperture in said shaft opening into said bore adjacent said winding, and a second radial aperture in said shaft opening into said bore adjacent said slip rings, terminal leads connected to and extending from said winding and said slip rings, and a collector lead arrangement for connecting a terminal lead of said slip rings to a terminal lead of said winding through said first and second radial aperture and said bore, said collector lead arrangement comprising: a first stud connected to said terminal lead of said slip rings and a second stud connected to said terminal lead of said winding, the end of said studs that is connected to said terminal leads each having a threaded portion, each of said studs having a cap nut and a jam nut operatively engaging said threaded portion and said terminal lead being interposed between said jam nut and said cap nut, said cap nut being tightened on said stud to provide electrical contact between said stud end and said cap nut, and said jam nut turned toward said cap nut to compress said terminal leads between said cap nut and said jam nut thereby providing a good electrical contact between said cap nut and one of said terminal leads, an axially extending conductor within said bore having an end portion opposite said terminal connected end connected to said axial conductor, and a second stud disposed in said second radial aperture having an end portion opposite said terminal connected to axial conductor to thereby provide a collector lead arrangement that can be assembled and disassembled free of damage to the current conducting surface.

References Cited in the file of this patent

UNITED STATES PATENTS

| | | |
|---|---|---|
| 2,286,871 | Mortensen | June 16, 1942 |
| 2,403,642 | Drazler | July 9, 1946 |
| 2,407,611 | Lewis | Sept. 10, 1946 |
| 2,798,977 | Henter | July 9, 1957 |